No. 630,794. Patented Aug. 8, 1899.
C. A. BAILEY.
WHEELED TOY.
(Application filed June 3, 1899.)

(No Model.)

Witnesses
Albert Shudurs

Inventor
Chas. A. Bailey
by John T. Thomas & Co.,
Attorney

THE NORRIS PETERS CO., PHOTO-LITHO., WASHINGTON, D. C.

UNITED STATES PATENT OFFICE.

CHARLES A. BAILEY, OF CROMWELL, CONNECTICUT, ASSIGNOR TO THE
J. & E. STEVENS COMPANY, OF SAME PLACE.

WHEELED TOY.

SPECIFICATION forming part of Letters Patent No. 630,794, dated August 8, 1899.

Application filed June 3, 1899. Serial No. 719,243. (No model.)

*To all whom it may concern:*

Be it known that I, CHARLES A. BAILEY, a citizen of the United States, residing at Cromwell, in the county of Middlesex and State of Connecticut, have invented a new and useful Wheeled Toy, of which the following is a specification.

The object of this invention is to provide a novel and pleasing wheeled toy for the amusement of children, embodying certain attractive features and including mechanical parts or figures which are automatically operated as the device is drawn along.

To this end the invention consists of a mechanical toy imitating a man fishing, and comprises a frame or float mounted on wheels and made to represent a pond, a bank surrounding the pond, and a tree-stump upon the bank at one end of the pond, the part of the float which represents the pond having an elongated opening through the same, in connection with the figure of a man seated on the stump and the figure of a fish located in the opening in the pond, the arms of the man being pivoted and movable by one of the supporting-axles and carrying in the hands a rod connected to the fish by a cord, whereby as the toy is drawn along the figure of the man will be intermittently operated to raise the rod and lift the fish out of the pond.

The invention is particularly described in the following specification, and what I claim as new is specifically set forth in the appended claims.

Figure 1:
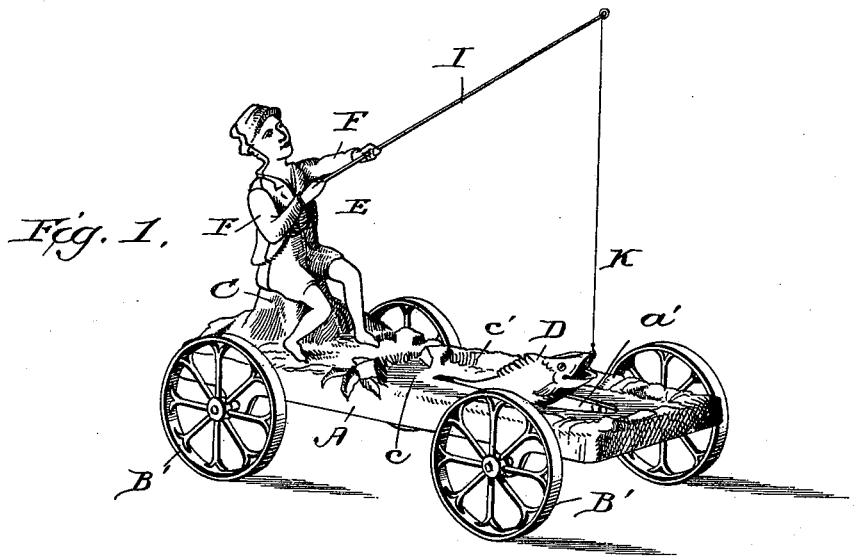
Figure 2:
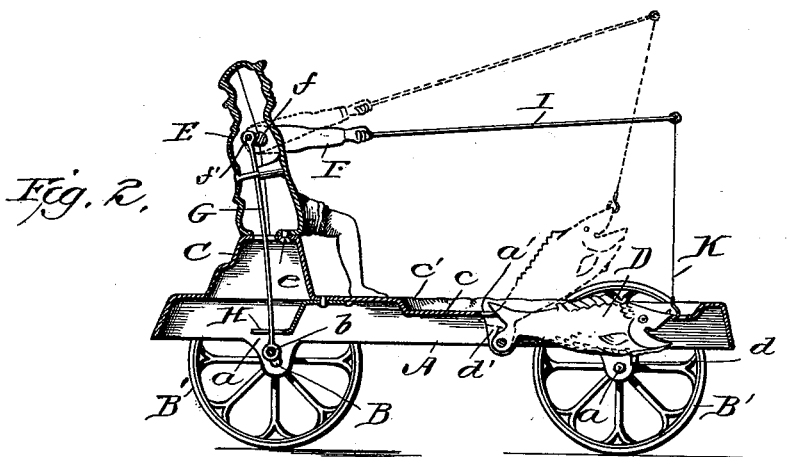
Figure 3:
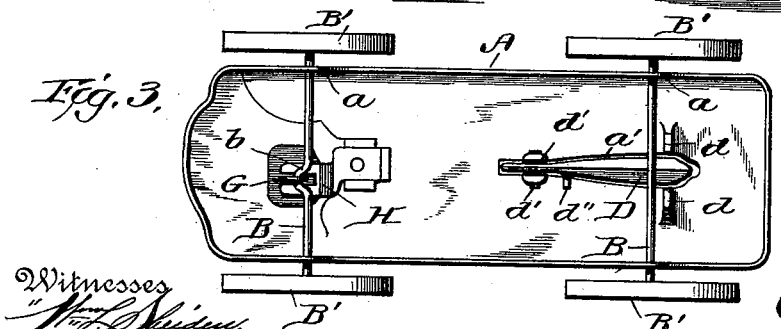

In the accompanying drawings, which form a part of the specification, Figure 1 is a perspective view of a wheeled toy constructed in accordance with my invention. Fig. 2 is a longitudinal sectional view. Fig. 3 is an inverted plan view.

Referring to said drawings, A designates a frame or float which is cast in one piece and provided at its sides with integral depending brackets $a$, forming bearings for the axles B, to the projecting ends of which the groundwheels B' are attached. The rear axle is provided with a crank portion $b$ and is intended to turn with its supporting-wheels for the purpose hereinafter explained.

The float or frame A is of a design to represent a pond $c$, surrounded by a bank $c'$ of the contour shown, and upon the bank a short distance from one end of the pond is a treestump C, said stump being located directly over the rear axle and is hollow. In that part of the float which represents the pond is an elongated opening $a'$, extending across the forward axle, and at each side of the forward portion of said opening depend guide-lugs $d\ d$, while at the rear end of said opening depend apertured ears $d'\ d'$, between which is pivoted the tail end of a fish D, the fish being of such size relative to the opening as to pass freely in and out of the same. The forward part of the fish is supported normally by the forward axle, upon which it rests, and the lugs $d$ serve to guide said fish in its movements in and out of the opening. When in its normal position, only a small part of the fish is above the pond, and its swinging movement upward is limited by a lug $d^2$, extending from the body of the fish adjoining its pivotal connection with the apertured ears $d'$.

Seated upon the stump C is the figure of a man, (designated by the letter E,) this figure being preferably in the pose or attitude shown, and as said figure is cast separate from the frame or float A it is attached to the stump by a screw $e$. The body of this figure is cast in two parts, and in casting the arms F F they are connected by a bar $f$, having a projection $f'$ apertured at its outer end. In putting the parts together the bar $f$ is seated in opposing recesses at the joint of the body to permit of a movement of said arms, and this movement is imparted by a rod G, connected to the projecting member $f'$ and to the crank portion $b$ of the rear axle. The rod is held in proper engagement with the crank portion of the axle by a bifurcated bracket-arm H, attached to the under side of the frame or float.

In the hands of the figure F is held a fishing-rod I, extending forwardly and of such length as to locate the outer end over the head of the fish D, to which it is connected by a string or flexible connection K. The string is of such length with respect to the movement of the rod that when said rod is swung to the limit of its upward movement the fish will be drawn out of the pond, as illustrated in dotted lines, Fig. 1. It will be understood, therefore, that when the toy is drawn along the turning of the rear axle will swing the arms F of the figure E through the medium of the connecting-rod G, and the said arms carrying the rod I upward the latter will draw upon the string and raise the fish out of the pond. The crank portion of the rear axle will impart this movement to the figures intermittently as the toy is drawn along.

The device provides a very attractive mechanical toy for children, which is automatically operated, and the parts are so constructed and arranged that they will not easily get out of order.

The toy will provide amusement for children, and though I have shown and described the man as catching a fish it is apparent that an alligator, frog, or other object may be connected to the rod. I therefore contemplate such modifications in the manufacture of the toy.

Having thus described my invention, I claim—

1. A wheeled toy, comprising a frame supported upon wheels and having an opening therein, a figure pivoted at one end of said opening to swing in and out of the same, a second figure having movable arms carrying a rod, a cross-bar connecting the arms and provided with a projecting portion, an operating-rod connected to said projecting portion and to a crank on an axle of the toy, and a string or flexible connection attached to the outer end of the rod and to the outer or free end of the pivoted figure, substantially as shown and described.

2. A wheeled toy, comprising a frame A supported upon wheels and having an opening therein over the forward axle, a figure pivoted in said opening and adapted to normally rest upon said axle, a second figure mounted on the frame and having a movable part carrying a rod, means operating said movable part from an axle of the toy, and a connection between the rod and pivoted figure aforesaid, substantially as shown and for the purpose set forth.

3. A wheeled toy, comprising a frame supported upon wheels and having an opening therein over the forward axle, a figure pivoted in said opening and resting normally upon said axle, guide-lugs depending from opposite sides of the opening, and a lug limiting the upward movement of the pivoted figure; together with a second figure mounted upon the frame and having a movable part, a rod connecting said movable part to a crank portion on the rear axle, a rod carried by the movable part, and a string connecting the outer end of the rod to the free end of the pivoted figure aforesaid, substantially as shown and described.

In testimony whereof I affix my signature in the presence of two witnesses.

CHAS. A. BAILEY.

Witnesses:
WILLIAM S. STICKNEY,
CHRISTINE L. STICKNEY.